(12) United States Patent
Satou et al.

(10) Patent No.: US 6,584,395 B2
(45) Date of Patent: Jun. 24, 2003

(54) VEHICLE RUNNING CONTROLLER AND VEHICLE

(75) Inventors: Kazuhiko Satou, Mito (JP); Toshimichi Minowa, Mito (JP); Satoru Kuragaki, Hitachi (JP); Tokuji Yoshikawa, Hitachi (JP); Takao Kojima, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/824,720

(22) Filed: Apr. 4, 2001

(65) Prior Publication Data

US 2001/0041959 A1 Nov. 15, 2001

(30) Foreign Application Priority Data

May 15, 2000 (JP) .......................................... 2000-147450

(51) Int. Cl.$^7$ .............................. G08G 1/08; G06F 17/00
(52) U.S. Cl. .............................. 701/70; 701/78; 701/83; 303/146
(58) Field of Search .............................. 701/70, 78, 83, 701/72; 303/146, 150, 163, 113.5, 155; 192/219.7

(56) References Cited

U.S. PATENT DOCUMENTS 5,411,452 A * 5/1995 Katayama .................... 477/206
6,157,887 A * 12/2000 Zittlau .......................... 701/70
6,253,887 B1 * 7/2001 Frank et al. ................. 188/197
6,276,136 B1 * 8/2001 Oishi et al. ................. 60/547.1

* cited by examiner

Primary Examiner—Tan Q. Nguyen
(74) Attorney, Agent, or Firm—Crowell & Moring LLP

(57) ABSTRACT

The footrest force of the footrest function attached to a vehicle braking pedal is adjusted by a driver's-lad estimation device for deciding a footrest force corresponding to an individual driver and correspondingly to a load computed by the load estimation device. A detection device for detecting whether the present vehicle presently corners is used to change the set speed of the vehicle in accordance with the radius of a corner.

9 Claims, 9 Drawing Sheets

VEHICLE RUNNING CONTROLLER AND VEHICLE

BACKGROUND OF THE INVENTION

The present invention relates to a vehicle running controller, a vehicle running method, and a vehicle using the controller and the method, particularly to following-distance-control auto-cruise including moderate acceleration/deceleration running, for example, under traffic congestion.

Techniques are positively developed, each of which detects the distance between a vehicle and a vehicle (including an obstacle) present ahead with a radar, and automatically controls the engine, motor, transmission, and brakes of the vehicle. Following-distance-control auto-cruise including moderate acceleration/deceleration running under traffic congestion (hereafter referred to as "ACC": Adaptive Cruise Control) is an example of the arts.

While a vehicle runs in accordance with the ACC, the load of a driver is reduced because the start, acceleration, and deceleration of the vehicle are automated and thereby, more comfortable driving can be realized. It is estimated that ACC including automatic stop is marketed.

However, the present ACC is not sufficient yet in capacities of an environment recognition sensor, automatic brake actuator, and controller, the coverage of the ACC is restricted to highways. When the ACC is used for a general road on which an event such as crossing of a pedestrian, a signal, a sign, or sudden run-out of a person may occur, automatic deceleration or stop is not frequently performed and there is a case in which a driver cannot help suddenly applying a brake.

Moreover, as ACC applicable to a general road, a system is also considered which performs deceleration and stop on one hand and start and acceleration on the other in accordance with the operation of only a brake pedal by using an existing hydraulic braking system.

A system in which a footrest function is added to a brake pedal is considered for the above two types of ACCs. Thereby, it is possible to realize sudden deceleration to avoid danger because a driver does not have to separate his foot from the brake pedal.

When a footrest function is added to a brake pedal, it is necessary that a driver sets a footrest functioning range because a footrest stepping force depends on the physical constitution of the driver and greatly differs in persons.

Moreover, because ACC running of a vehicle on a curved or rough road is performed by using a set speed same as that for a straight road as an upper limit when there is no vehicle ahead, it is necessary to adjust the speed by driver's stepping on a brake and therefore, the load of a driver cannot be avoided.

SUMMARY OF THE INVENTION

The above problem can be solved by a vehicle running controller for controlling the driving/braking force of a vehicle in accordance with the manipulated variable or operating force of a pedal having a footrest function, which has driver's load estimation means and adjusts the footrest force of the footrest function in accordance with a load computed by the load estimation means.

It is preferable to use a vehicle running controller in which load estimation means includes load detection means provided to a pedal and footrest-force calculation means for estimating a footrest force in accordance with a detected load.

It is more preferable to use a vehicle running controller in which load estimation means includes brake-fluid-pressure detection means provided to a braking system and footrest-force calculation means for estimating a footrest force in accordance with a detected brake-fluid-pressure.

It is still more preferable to use a vehicle running controller in which load estimation means includes final-posture-load detection means provided to a driver seat and footrest-force calculation means for estimating a footrest force in accordance with a detected final-posture load.

It is still more preferable to use a vehicle running controller in which load estimation means includes foot-load detection means provided to a floor and footrest-force calculation means for estimating a footrest force in accordance with a detected foot load.

It is still more preferable to use a vehicle running controller in which load estimation means includes pedal-position detection means provided to a pedal or nearby the pedal and footrest-force calculation means for estimating a footrest force in accordance with a detected pedal position.

It is still more preferable to use a vehicle running controller in which load estimation means includes body-weight input means for inputting the body weight of a driver and footrest-force calculation means for estimating a footrest load in accordance with an input body weight.

It is still more preferable to use a vehicle running controller further comprising manual footrest-force correction means.

The above problems can be solved by a vehicle in which the driving/braking force of the vehicle is controlled in accordance with the manipulated variable or operating force of a pedal having a footrest function, which has driver's-load estimation means, and in which the footrest force of the footrest function is adjusted in accordance with a load computed by the load estimation means.

The above problems can be solved by a vehicle running controller comprising road-condition detection means to automatically control the running of the present vehicle in accordance with a running environment detected by the road-condition detection means, which further comprises detection means for detecting whether the vehicle presently corners to change the set speed of the vehicle in accordance with the radius of a corner.

The above problems can be solved by a vehicle running controller comprising road-condition detection means to automatically control the running of the present vehicle in accordance with a running environment detected by the road-condition detection means, which further comprises detection means for detecting whether the vehicle presently corners to change the set speed of the vehicle in accordance with the radius of a corner.

The above problems can be solved by a vehicle running controller comprising road-condition detection means to automatically control the running of the present vehicle in accordance with a running environment detected by the road-condition detection means, which further comprises detection means for detecting whether the vehicle presently runs on a rough road to change the set speed of the vehicle in accordance with the quality of the rough road.

The above problems can be solved by a vehicle running controller for controlling the driving/braking force of a vehicle in accordance with the manipulated variable of operating force of a pedal and comprising road-condition detection means to automatically control the running of the vehicle in accordance with a running environment detected by the road-condition detection means, in which the vehicle is controlled in accordance with the acceleration or speed of a vehicle if present ahead.

The above problems can be solved by a vehicle running controller for controlling the driving/braking force of a vehicle in accordance with the manipulated variable or operating force of a pedal and comprising road-condition detection means to automatically control the running of the vehicle in accordance with a running environment detected by the road-condition detection means, in which the vehicle is controlled so as to maintain the vehicle speed when a driver applies a brake if a vehicle is present ahead.

The above problems can be solved by a vehicle running controller for controlling the driving/braking force of a vehicle in accordance with the manipulated variable or operating force of a pedal and comprising road-condition detection means to automatically control the running of the vehicle in accordance with a running environment detected by the road-condition detection means, in which the vehicle is controlled so that the vehicle is accelerated in accordance with an accelerator operation by a driver when the right-turn signal lamp of the vehicle is turned on and the vehicle runs at an optional speed or lower.

The above problems can be solved by a vehicle running controller comprising road-condition detection means to automatically control the running of the present vehicle in accordance with a running environment detected by the road-condition detection means, which further comprises detection means for detecting whether the vehicle runs on a rough road to change the set acceleration of the vehicle in accordance with the quality of the rough road.

The above problems can be solved by a vehicle running controller comprising road-condition detection means to automatically control the running of the present vehicle in accordance with a running environment detected by the road-condition detection means, which further comprises detection means for detecting whether the vehicle presently corners to change the set speed and/or set acceleration of the vehicle in accordance with the radius of a corner.

The above problems can be solved by a vehicle comprising road-condition detection means to automatically control the running of the present vehicle in accordance with a running environment detected by the road-condition detection means, which further comprises detection means for detecting whether the vehicle presently runs on a rough road to change the set speed and/or set acceleration of the vehicle in accordance with the quality of the rough road.

The above problems can be solved by a vehicle for controlling the driving/braking force of the vehicle in accordance with the manipulated variable or operating force of a pedal and comprising road-condition detection means, in which the running of the vehicle is automatically controlled in accordance with a running environment detected by the road-condition detection means and the vehicle is controlled in accordance with the acceleration and/or speed of a vehicle if present ahead.

The above problems can be solved by a vehicle for controlling its driving/braking force in accordance with the manipulated variable or operating force of a pedal and comprising road-condition detection means, in which the running of the vehicle is automatically controlled in accordance with a running environment detected by the road-condition detection means and the vehicle is controlled so that the vehicle speed when a driver applies a brake is maintained when a vehicle is present ahead.

The above problems can be solved by a vehicle for controlling its driving/braking force in accordance with the manipulated variable or operating force of a pedal and comprising road-condition detection means, in which the running of the vehicle is automatically controlled in accordance with a running environment detected by the road-condition detection means and the vehicle is controlled so as to be accelerated through an accelerator operation by a driver when the right-turn signal lamp of the vehicle is turned on and the vehicle runs at an optional speed or lower.

DETAILED DESCRIPTION OF THE EMBODIMENTS

Though embodiments of the present invention are described below, the present invention is not restricted to these embodiments.

Figure 1:
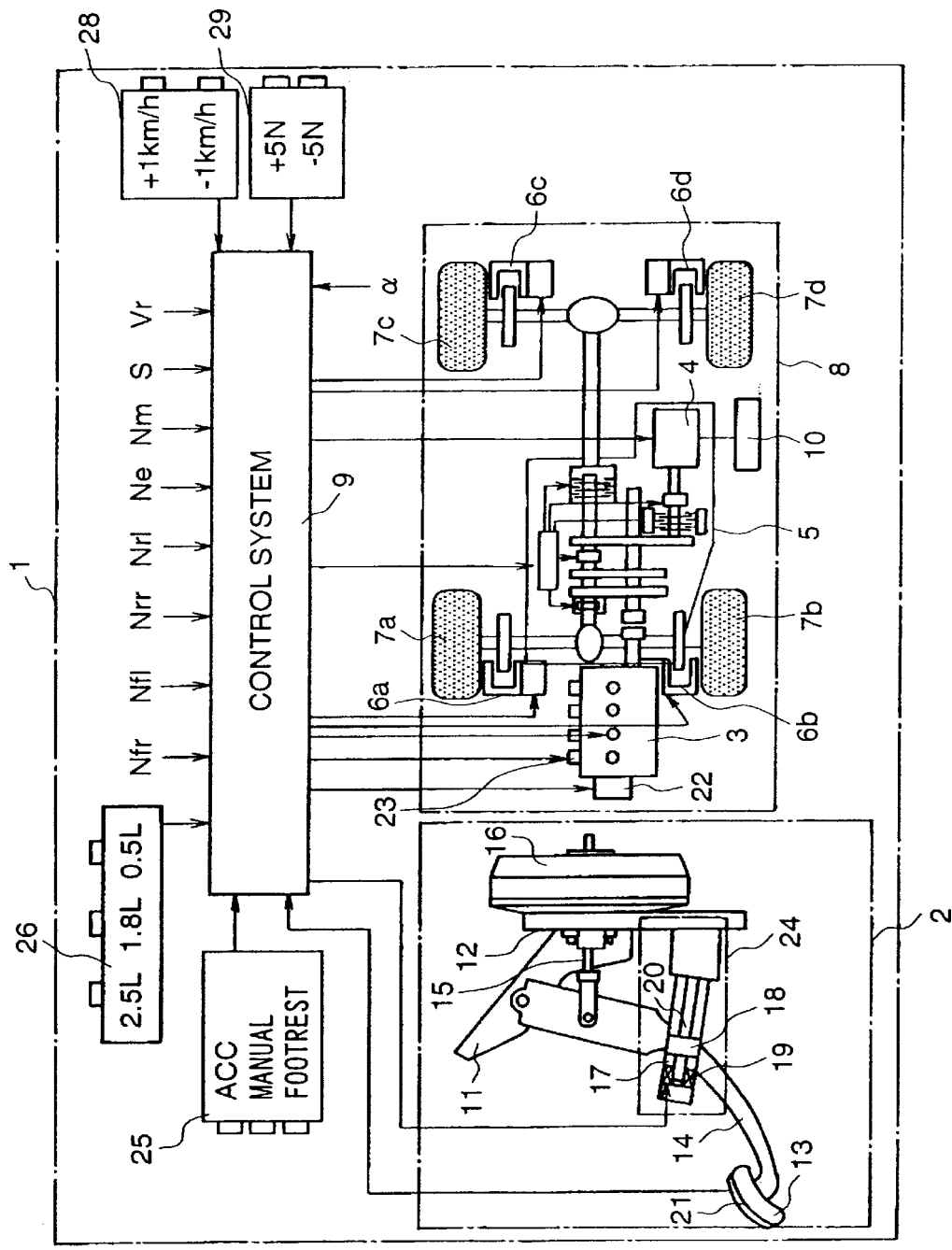
FIG. 1 shows a block diagram of a vehicle of an embodiment of the present invention.

FIG. 1 is a block diagram of the vehicle of an embodiment of the present invention.

The following are mounted on the vehicle 1: a brake operating mechanism 2, a transmission 5 including an engine 3 and a motor 4, a brake driving system 8 constituted of braking systems 6a to 6d and tires 7a to 7d, and a control system 9 for controlling the brake driving system 8 in accordance with input information (to be mentioned later).

The motor 4 has an energy regenerative function also. When the motor 4 executes its motor function, it receives electric energy from a battery 10, and performs the start of the engine 3 and the drive of tires 7a to 7d. Conversely, when the motor 4 executes the energy regenerative function, it converts the kinetic energy, which it receives from the rotation of the tires 7a to 7d, to electric energy, and stores the electric energy in the battery 10.

First, the brake operating mechanism 2 is described below. A solenoid-type footrest system 24 is set to a body 12 of the vehicle 1. The solenoid-type footrest system 24 is constituted of a coil 19, a stator 17, a moving element 18 connected or integrated with a brake pedal arm 14, and a moving-element guide groove 20. In this case, when turning on the coil 19, an electromagnetic force is generated and the moving element 18 is attracted by the stator 17. Because the moving element 18 is connected or integrated with the brake pedal arm, it controls the movement when a driver steps on the brake pedal 13. By setting the amount of current to be supplied to the coil 19 to a proper value, it is possible to make the moving element 18 have the function as a so-called footrest for controlling the movement of the brake pedal 13 so that brakes are not operated even if the driver naturally puts his foot on the brake pedal 13.

Then, the control system 9 for controlling the brake driving system 8 is described below.

The control system 9 has a control unit (not illustrated) for controlling the engine 3, transmission 5, and braking system 6 and a control unit (not illustrated) for controlling the whole of the brake driving system 8 and the units are communicated each other through a network.

Moreover, the following are input to the control system 9: a following distance S with a front vehicle and a relative speed Vr with a front vehicle from which information of a brake-pedal-operating-force sensor 21, a running-mode setting switch 25, a driving-force (acceleration) setting switch 26, accelerator-pedal-manipulated-variable-sensor information aaa, right-front-wheel-rotation-sensor information Nfr, left-front-wheel-rotation-sensor information Nfl, right-rear-wheel-rotation-sensor information Nrr, left-rear-wheel-rotation-sensor information Nrl, engine-rotation information Ne, motor-rotation information Nm, and a not-illustrated radar system are obtained, a speed setting switch 28 to which a driver can set a target speed, and a footrest-force correction switch 29.

According to these input signals, the engine 3, transmission 5, and braking system 6 are controlled and acceleration, deceleration, start, and stop of a vehicle are executed. In this case, the footrest force is estimated by the control system 9 in accordance with the information sent from the brake-pedal-operating-force sensor 21 and reflected on the amount of current to be supplied to the coil 19 of the solenoid-type footrest system 24. Operations of the footrest system 24 can be turned on/off by a footrest button of the running-mode setting switch 25.

Figure 2:
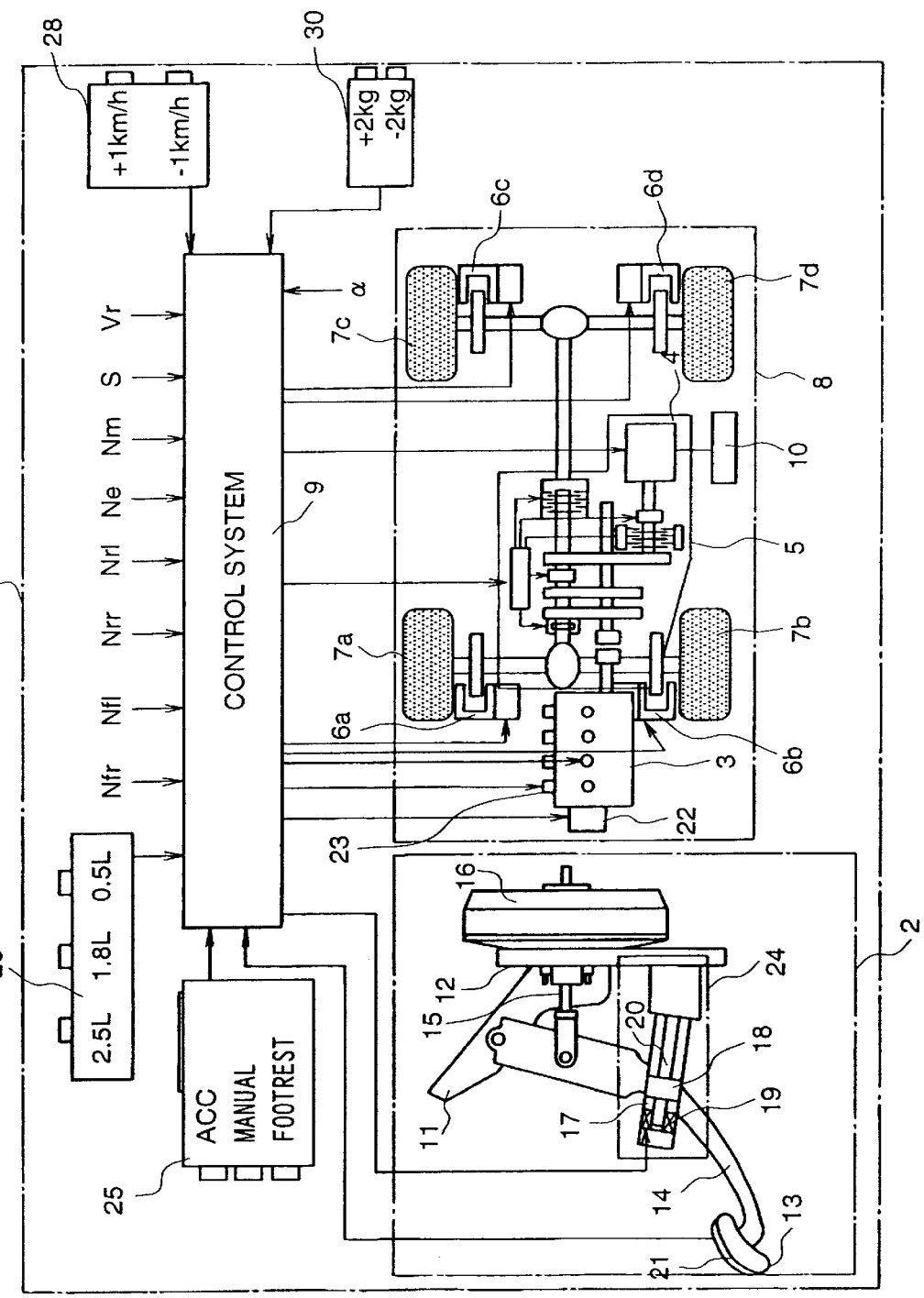
FIG. 2 shows a block diagram of a vehicle of an embodiment of the present invention.

FIG. 2 is a block diagram of a configuration of a vehicle of an embodiment of the present invention. For FIG. 1, a body-weight input switch 30 is provided instead of the footrest-force correction switch 29. Thereby, it is possible to correct a footrest force by inputting a body weight or directly set the footrest force. Moreover, it is permitted to use the switch 30 together with the footrest-force correction switch 29.

Figure 3:
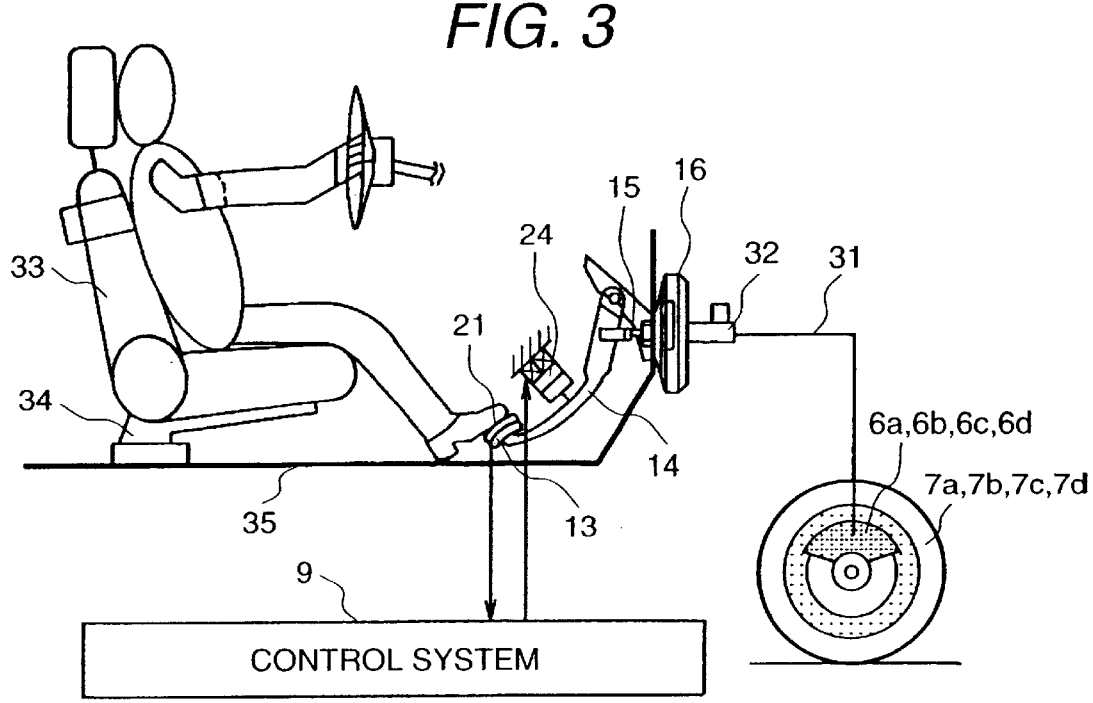
FIG. 3 shows load estimation means of an embodiment of the present invention.

FIG. 3 shows load estimation means of an embodiment of the present invention. In the case of this embodiment, a footrest force is calculated by a control system 9 in accordance with the information sent from a brake-pedal-operating-force sensor 21 and reflected on a solenoid-type footrest system 24.

Figure 4:
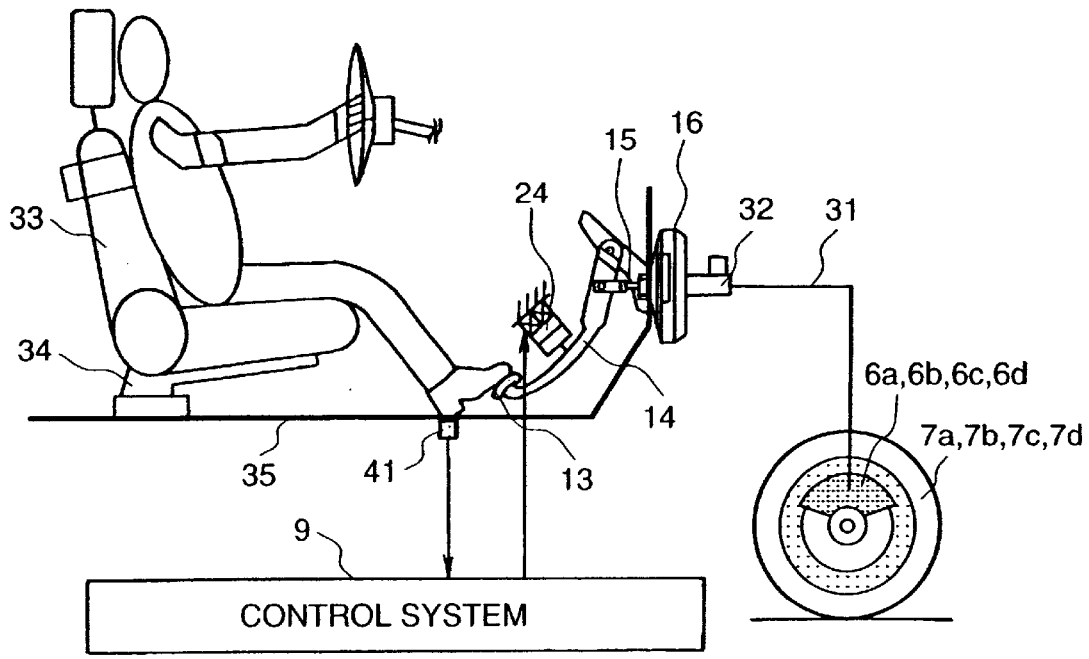
FIG. 4 shows load estimation means of an embodiment of the present invention.

FIG. 4 shows load estimation means of an embodiment of the present invention. In the case of this embodiment, a footrest force is calculated by a control system 9 in accordance with the information sent from a load sensor 41 embedded in a floor 35 and reflected on a solenoid-type footrest system 24.

Figure 5:
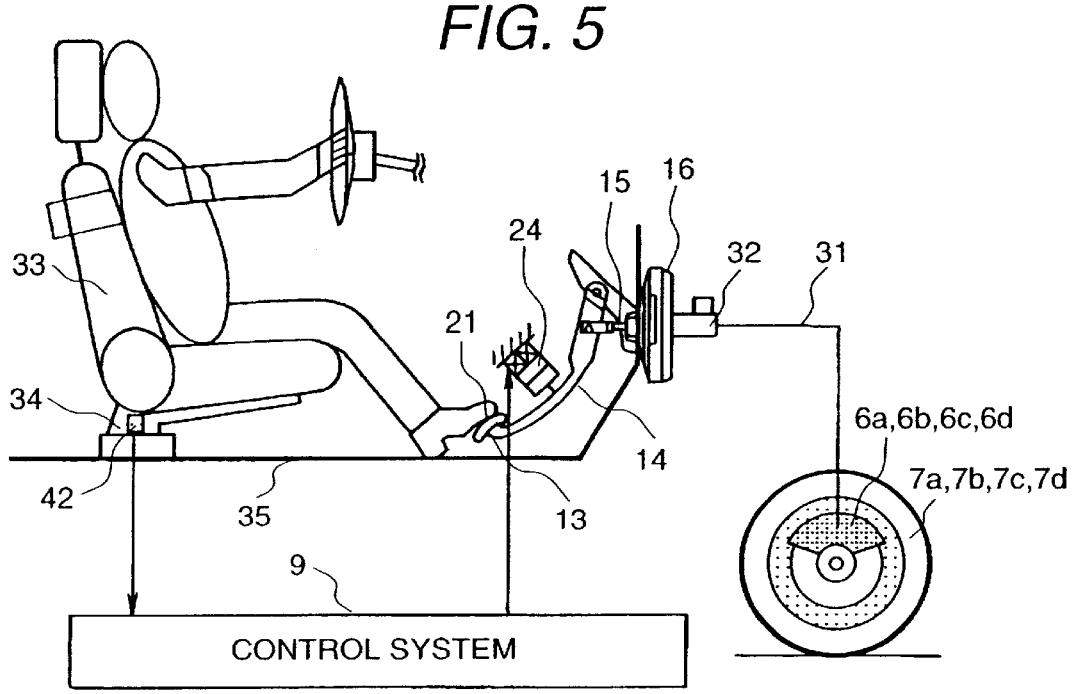
FIG. 5 shows load estimation means of an embodiment of the present invention.

FIG. 5 shows load estimation means of an embodiment of the present invention. In the case of this embodiment, a footrest force is calculated by a control system 9 in accordance with the information sent from a load sensor 42 embedded in a support 34 between a driver seat 33 and a floor 35 and reflected on a solenoid-type footrest system 24.

Figure 6:
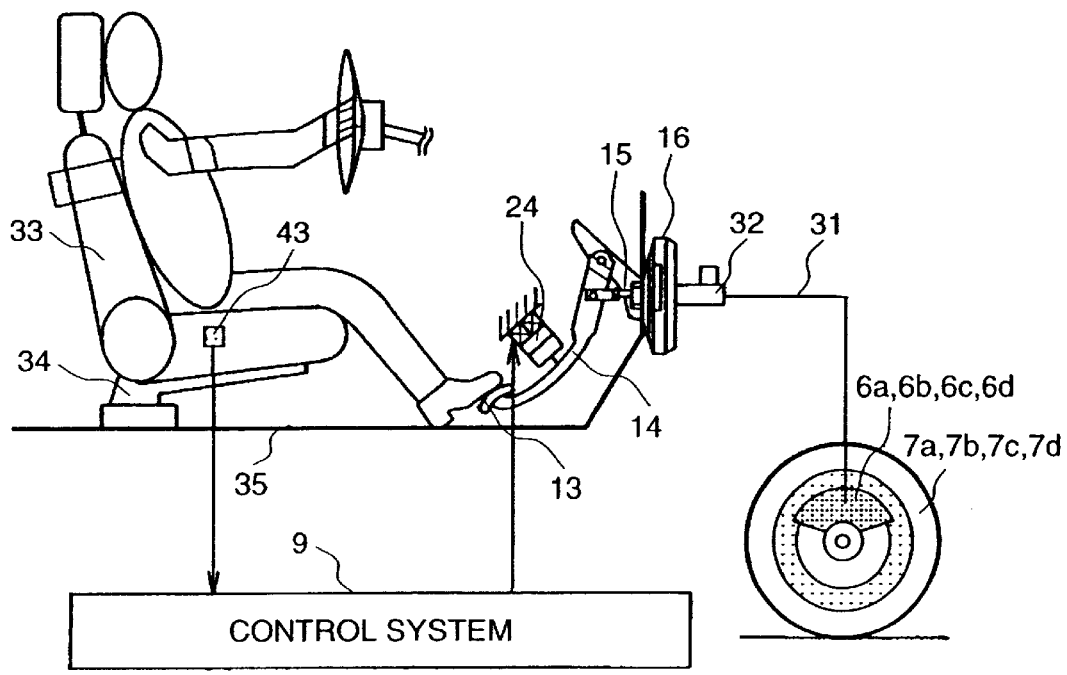
FIG. 6 shows load estimation means of an embodiment of the present invention.

FIG. 6 shows load estimation means of an embodiment of the present invention. In the case of this embodiment, a footrest force is calculated by a control system 9 in accordance with the information sent from a load sensor 43 embedded in a driver seat 33 and reflected on a solenoid-type footrest system 24.

Figure 7:
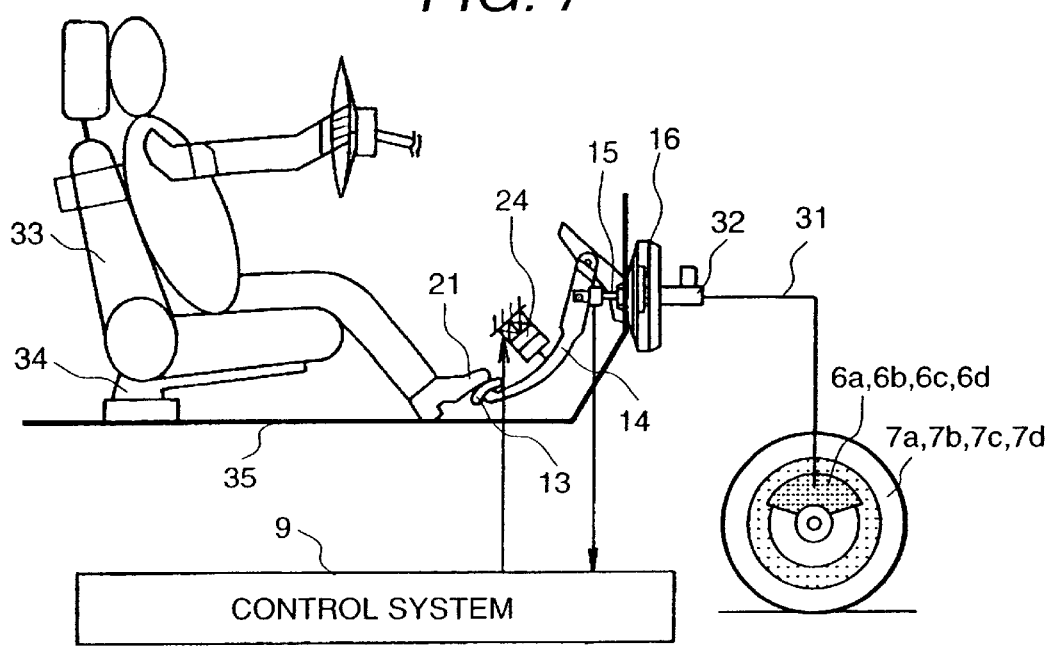
FIG. 7 shows load estimation means of an embodiment of the present invention.

FIG. 7 shows load estimation means of an embodiment of the present invention. In the case of this embodiment, a footrest force is calculated by a control system 9 in accordance with the information sent from a position sensor 46 for detecting the position of a push rod 15 and reflected on a solenoid-type footrest system 24.

Figure 8:
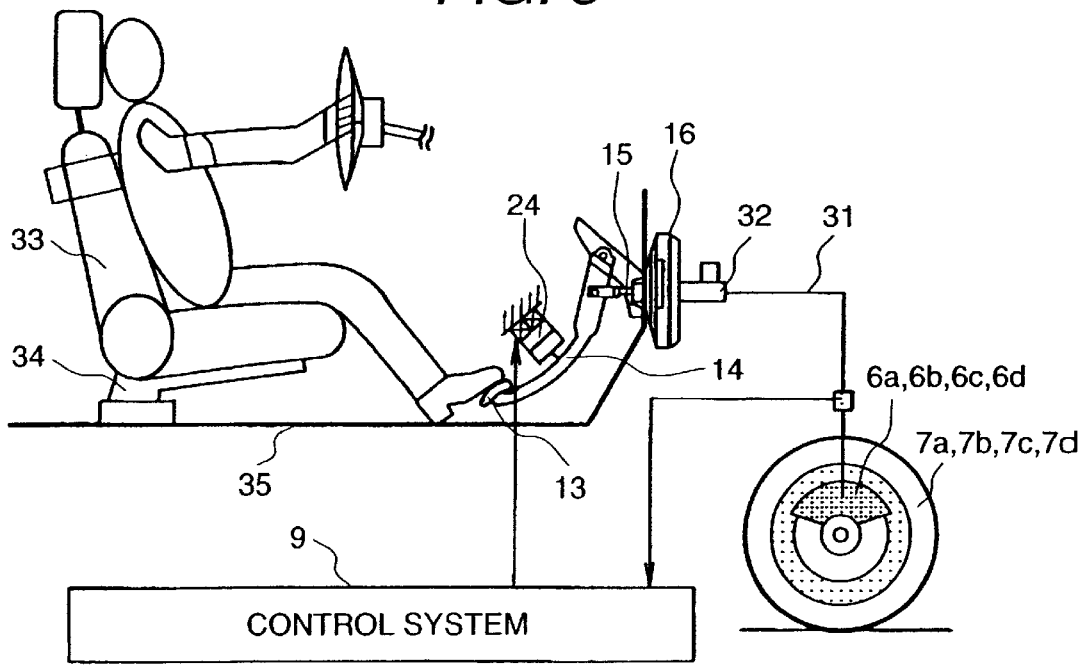
FIG. 8 shows load estimation means of an embodiment of the present invention.

FIG. 8 shows load estimation means of an embodiment of the present invention. In the case of this embodiment, a footrest force is calculated by a control system 9 in accordance with the information sent from an pressure sensor 47 set in a hydraulic line 31 and reflected on a solenoid-type footrest system 24.

It is permitted that pieces of the information sent from the load sensors and position sensors shown in FIGS. 3 to 8 are coexistent.

Figure 9:
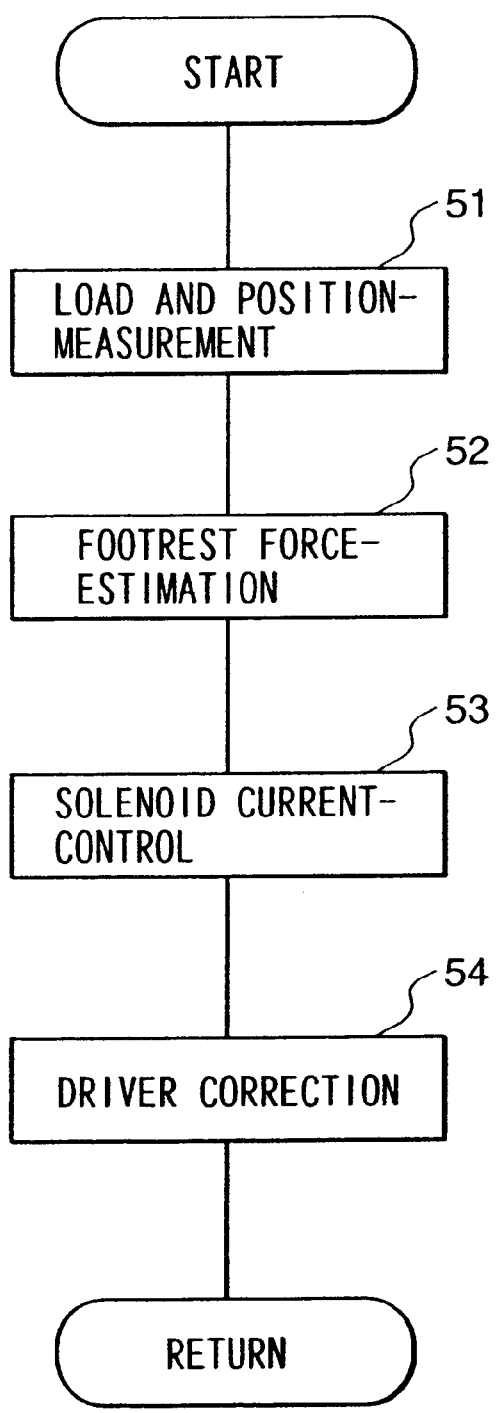
FIG. 9 shows a flowchart up to estimation of a footrest force of an embodiment of the present invention.

FIG. 9 is a flowchart up to estimation of a footrest of an embodiment of the present invention. After start, a load or a position is measured by a load or position sensor for calculating the footrest force of a driver through processing 51. Then, the footrest force is estimated through processing 52 in accordance with a captured load- or position-sensor signal. Then, the current of a solenoid-type footrest system is controlled in accordance with the estimated footrest force through processing 53. Then, if correction is necessary, a driver manually performs correction through processing 54. It is possible to set a footrest force in accordance with the above flow.

Figure 10:
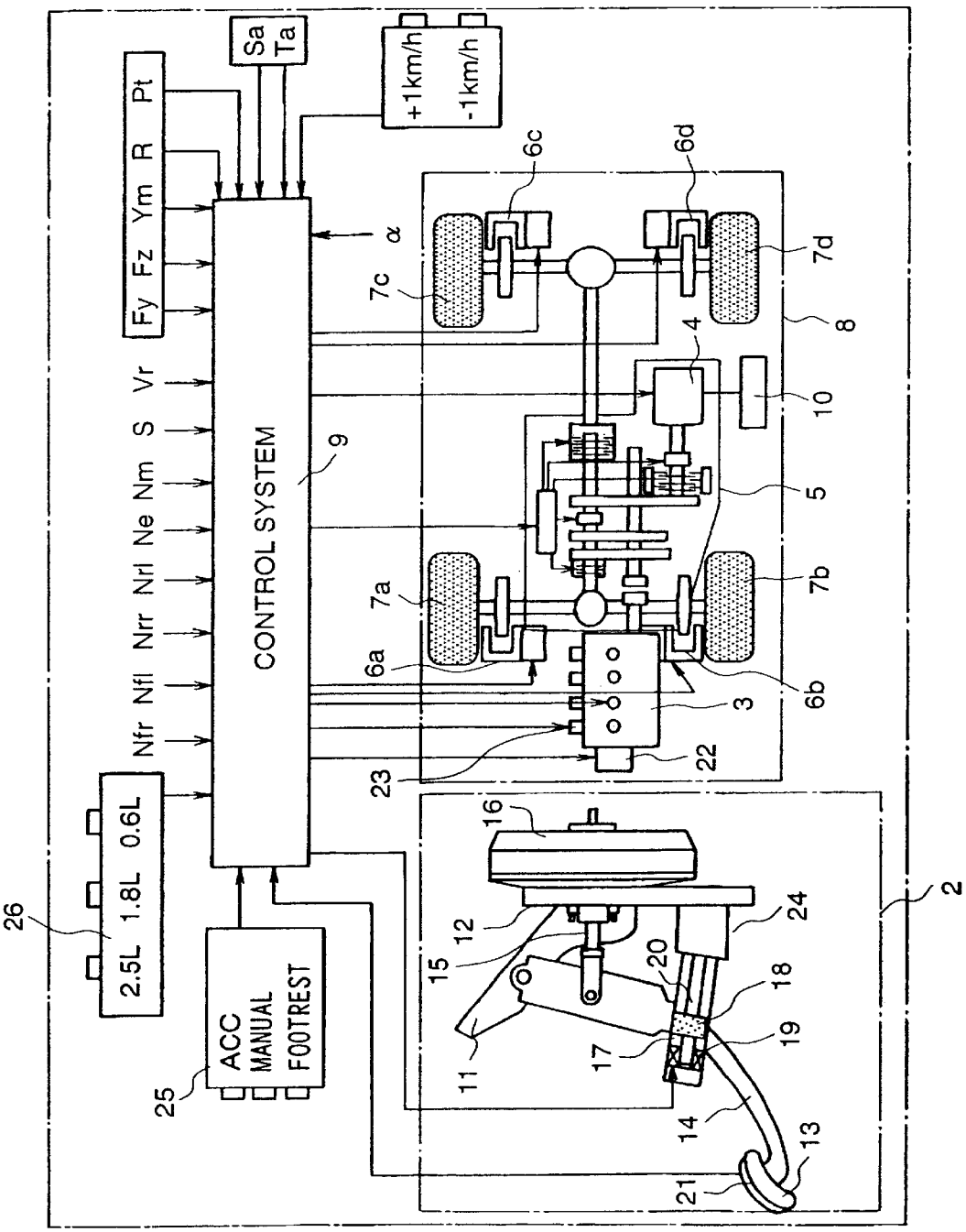
FIG. 10 shows a block diagram of a vehicle of an embodiment of the present invention.

FIG. 10 is a block diagram of a vehicle of an embodiment of the present invention.

The following are input to a control system 9 in addition to the contents described for FIGS. 1 and 2: the information sent from a vehicle-stability detection sensor 31 including horizontal movement Fy, yaw moment Ym, and rolling moment R which serve as means for determining whether a vehicle presently corners, and vertical movement Fz and pitching moment Pt serving as means for determining whether a vehicle presently runs on a rough road, and the information sent from a steering sensor 61 including a steering angle Sa and a wheel angle Ta serving as means for determining whether a vehicle presently corners.

When a vehicle approaches a rough road or curved road while running in the ACC mode, actuators of an accelerator and brakes are immediately controlled and the present-vehicle speed is made proper by processing the information from the above sensors and reflecting the information on a set speed and therefore, the vehicle can stably run. Moreover, it is preferable that a plurality of types of information are received from the above sensors if possible. However, even only one type of information such as only horizontal movement or yaw moment can sufficiently show an effect.

Moreover, particularly in the case of a vehicle running controller having a function for controlling the driving/braking force of the present vehicle in accordance with the manipulated variable or operating force of a pedal, even if a vehicle is present ahead, the vehicle does not run into the vehicle from behind by controlling the vehicle in accordance with the acceleration and/or speed of the vehicle.

Also in the above case, it is safer that a driver controls his vehicle so as to maintain the vehicle speed when he applies brakes.

Moreover, when the above vehicle turns right by turning on its right-turn signal lamp, a too-low vehicle speed is rather dangerous. In this case, it is preferable to control the vehicle so as to be accelerated by operating the accelerator.

Figure 11:
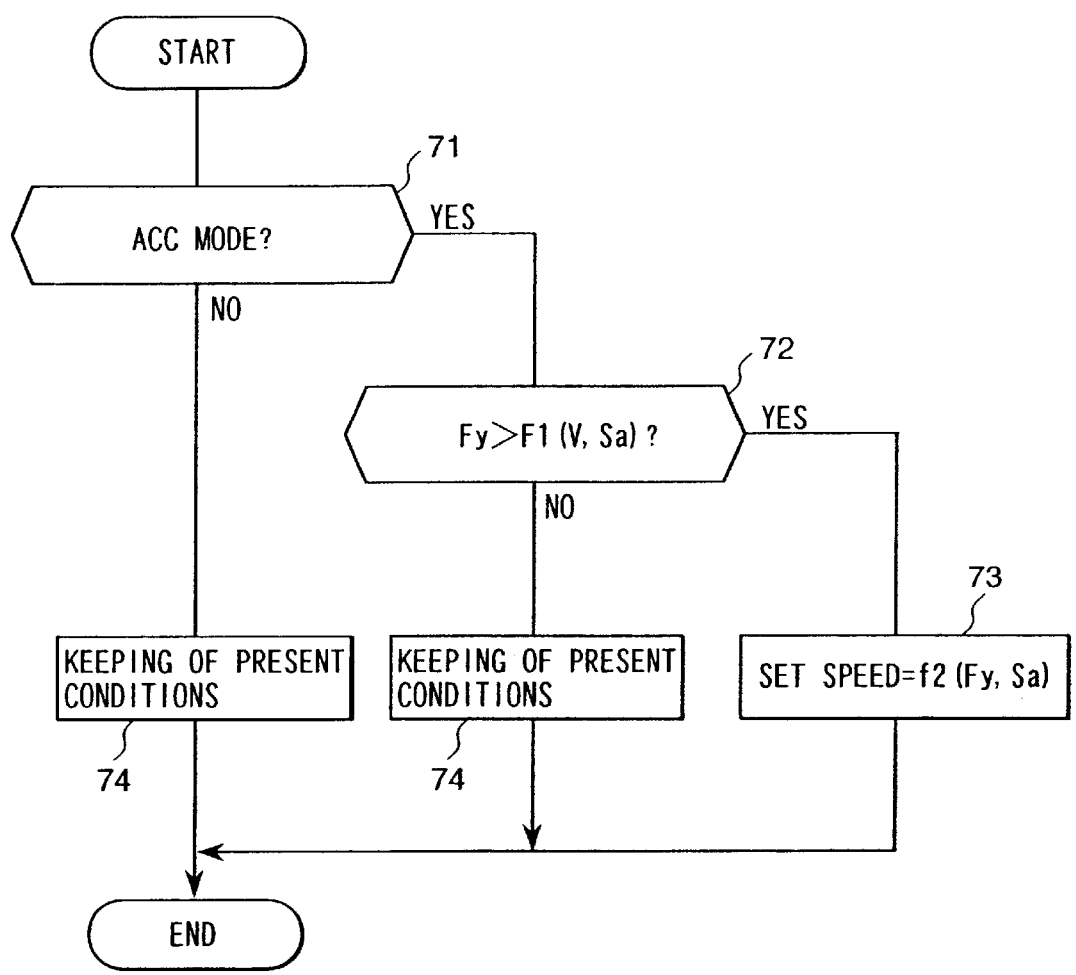
FIG. 11 shows a flowchart of set-speed change of an embodiment of the present invention.

FIG. 11 is a flowchart for set-speed change of an embodiment of the present invention. For this embodiment, cases of the horizontal movement Fy and steering angle Sa are described. After start, it is determined through processing 71 whether the present mode is the ACC mode. When the current mode is not the ACC mode, the present situation is kept through processing 74. When the present mode is the ACC mode, it is determined through processing 72 which is larger, the then horizontal movement Fy or the value obtained from the function f1 of the then speed V and steering angle Sa. In this case, when the horizontal movement Fy is smaller than or equal to the value, processing 72 is started and the present situation is maintained. However, when the horizontal movement Fy is larger than the value, a set speed is decided by the function 2 of the horizontal movement Fy and steering angle Sa. For the functions f1 and f2, infinite variations are considered depending on the difference in maker, individual taste, or concept on safety. Therefore, the functions f1 and f2 are not restricted to the case of this embodiment.

Figure 12:
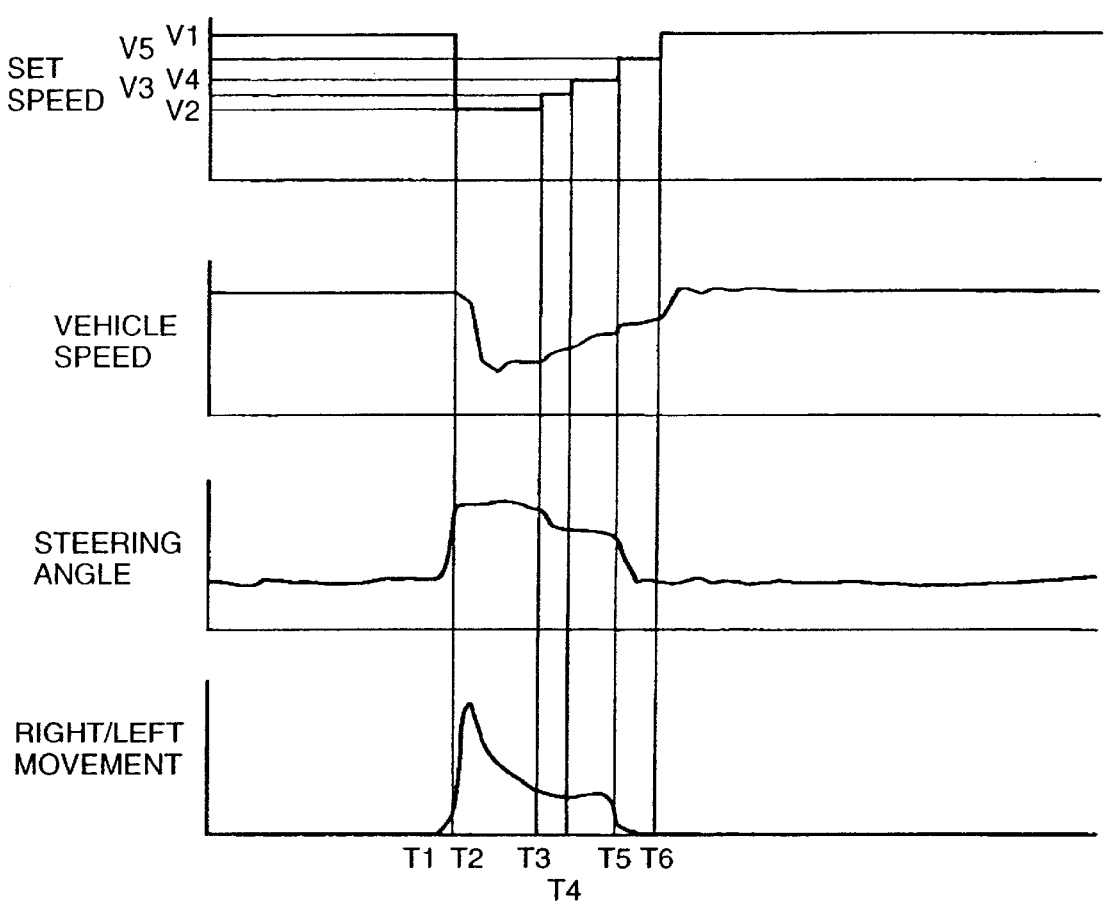
FIG. 12 shows a time chart under cornering of an embodiment of the present invention.

FIG. 12 shows a time chart for cornering of an embodiment of the present invention.

The present vehicle presently ACC-runs at a speed V1. A steering angle increases at a time T1, the vehicle breaks into a curve, and simultaneously a horizontal movement generally referred to as lateral G also increases. When the horizontal movement exceeds a certain value at a time T2, the set vehicle speed changes from V1 to V2 and the present vehicle starts deceleration. In this case, the horizontal movement of the vehicle starts decrease simultaneously with deceleration of the vehicle. The set speed changes from V2 to V3 at a time T3 at which the horizontal movement becomes a certain value or less and thereby, the present-vehicle speed also increases. In this case, however, because the horizontal movement is not increased, the set speed changes from V3 to V4 at a time T4. At the same time, the set speed changes from V4 to V5 at a time T5 and the set speed returns to V1 from V5 at a time T6 at which an steering operation is completed. It is possible to safely perform ACC running even under cornering in accordance with the above control. This control method also makes it possible to safely perform ACC running by processing the information for vertical movement and pitching moment not only under cornering but also under rough-road running.

It is permitted to form a configuration in which some parts of the above embodiments are combined as long as the configuration is kept in the range of the present invention. Moreover, through this embodiment uses the solenoid type as the footrest system. However, the same advantage as the case of the solenoid type can be obtained even by the stopper type.

According to the present invention, it is possible to provide ACC further superior in serviceability and operability because it is possible to automatically set a footrest force in accordance with the physical constitution of a driver and thereby, reduce the load of the driver.

Moreover, it is possible to provide a safer running controller because a set speed is automatically adjusted in accordance with the magnitude of the information content including horizontal movement and yaw moment even under ACC running on a curved road or rough road.

What is claimed is:

1. A running controller for controlling a running condition of a vehicle in accordance with an operating amount or an operating force of a pedal for carrying out a braking operation, said pedal having a footrest function which does not carry out said braking operation when a predetermined load is received, wherein said controller is configured such that said footrest force of said footrest function is determined in accordance with a load measurement value in which a load being added to said pedal is measured and a footrest force estimation force value which is calculated from said load measurement value.

2. The vehicle running controller according to claim 1, wherein the load estimation device includes load detection means provided for a pedal and footrest-force calculation device which estimates the footrest force in accordance with a detected load.

3. The vehicle running controller according to claim 1, wherein the load estimation device includes brake-fluid-pressure detection means provided to a driver seat and footrest-force calculation device which estimates the footrest force in accordance with a detected brake-fluid-pressure.

4. The vehicle running controller according to claim 1, wherein the load estimation device includes final-posture-load detection means provided to a driver seat and footrest-force calculation device which estimates the footrest force in accordance with a detected final-posture load.

5. The vehicle running controller according to claim 1, wherein the load estimation device includes foot-load detection means provided to a floor and footrest-force calculation device which estimates the footrest force in accordance with a detected foot load.

6. The vehicle running controller according to claim 1, wherein the load estimation device includes pedal-position detection means provided to or nearby a pedal and footrest-force calculation device which estimates the footrest force in accordance with a detected pedal position.

7. The vehicle running controller according to claim 1, wherein the load estimation device includes body-weight input means for inputting the body weight of a driver and footrest-force calculation device which estimates the footrest load in accordance with an input body weight.

8. The vehicle running controller according to claim 1, further comprising manual footrest-force correction means.

9. A vehicle having a running controller for controlling a running condition of a vehicle in accordance with an operating amount or an operating force of a pedal for carrying out a braking operation, said pedal having a footrest function which does not carry out said braking operation when a predetermined load is received, wherein said controller is configured such that said footrest force of said footrest function is determined in accordance with a load measurement value in which a load being added to said pedal is measured and a footrest force estimation force value which is calculated from said load measurement value.

* * * * *